(12) United States Patent
Sung (10) Patent No.: US 11,039,352 B1
(45) Date of Patent: Jun. 15, 2021

(54) DYNAMIC CONTROL OF THRESHOLD CONDITION FOR CARRIER SWITCHING BASED ON WHETHER UE IS SERVED WITH DUAL CONNECTIVITY

(71) Applicant: Sprint Spectrum L.P., Overland Park, KS (US)

(72) Inventor: Sanghoon Sung, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/929,196

(22) Filed: Dec. 23, 2019

(51) Int. Cl.
| | | |
|---|---|---|
| H04W 36/00 | (2009.01) | |
| H04W 36/06 | (2009.01) | |
| H04W 36/22 | (2009.01) | |
| H04W 36/30 | (2009.01) | |
| H04W 36/38 | (2009.01) | |
| H04W 88/06 | (2009.01) | |

(52) U.S. Cl.
CPC . *H04W 36/00837* (2018.08); *H04W 36/0069* (2018.08); *H04W 36/06* (2013.01); *H04W 36/22* (2013.01); *H04W 36/30* (2013.01); *H04W 36/38* (2013.01); *H04W 88/06* (2013.01)

(58) Field of Classification Search
CPC ......... H04W 36/0066; H04W 36/0069; H04W 36/00837; H04W 36/06; H04W 36/14; H04W 36/22; H04W 36/30; H04W 36/38; H04W 88/06
See application file for complete search history.

(56) References Cited

U.S. PATENT DOCUMENTS

| | | | |
|---|---|---|---|
| 10,098,181 B2 | 10/2018 | Vashi et al. | |
| 2002/0075827 A1* | 6/2002 | Balogh | H04L 1/0027 370/331 |
| 2017/0318503 A1* | 11/2017 | Chiba | H04W 36/0027 |
| 2017/0366313 A1* | 12/2017 | Rahman | H04W 56/00 |
| 2018/0220303 A1* | 8/2018 | Futaki | H04W 48/16 |
| 2019/0132066 A1* | 5/2019 | Park | H04W 36/0079 |
| 2020/0137819 A1* | 4/2020 | Shi | H04W 76/19 |
| 2020/0275430 A1* | 8/2020 | Salem | H04L 1/1812 |

* cited by examiner

*Primary Examiner* — Yuwen Pan
*Assistant Examiner* — Hung K Du (57) ABSTRACT

A mechanism for controlling a measurement threshold used for triggering transition of a user equipment device (UE) from being connected with a first access node on a first carrier to being connected with the first access node instead on a second carrier. A determination is made as to whether the first carrier on which the UE is connected with the first access node is an anchor carrier for dual-connectivity service of the UE. And responsive to at least the determination being that the first carrier on which the UE is connected with the first access node is the anchor carrier for dual-connectivity service of the UE, the measurement threshold is adjusted from a default level to an adjusted level to help facilitate transition of the UE from being connected with the first access node on the first carrier to being connected with the first access node instead on the second carrier.

20 Claims, 4 Drawing Sheets

---

MAKE A DETERMINATION OF WHETHER A FIRST CARRIER ON WHICH A UE IS CONNECTED WITH A FIRST ACCESS NODE IS AN ANCHOR CARRIER FOR DUAL-CONNECTIVITY SERVICE OF THE UE — 32

RESPONSIVE TO AT LEAST THE DETERMINATION BEING THAT THE FIRST CARRIER ON WHICH THE UE IS CONNECTED WITH THE FIRST ACCESS NODE IS THE ANCHOR CARRIER FOR DUAL-CONNECTIVITY SERVICE OF THE UE, ADJUST A MEASUREMENT THRESHOLD FROM A DEFAULT LEVEL TO AN ADJUSTED LEVEL TO HELP FACILITATE TRANSITION OF THE UE FROM BEING CONNECTED WITH THE FIRST ACCESS NODE ON THE FIRST CARRIER TO BEING CONNECTED WITH THE FIRST ACCESS NODE INSTEAD ON THE SECOND CARRIER — 34

DYNAMIC CONTROL OF THRESHOLD CONDITION FOR CARRIER SWITCHING BASED ON WHETHER UE IS SERVED WITH DUAL CONNECTIVITY

BACKGROUND

A cellular wireless network typically includes a number of cell sites including access nodes that are configured to provide wireless coverage areas in which user equipment devices (UEs) such as cell phones, tablet computers, machine-type-communication devices, tracking devices, embedded wireless modules, and/or other wirelessly equipped communication devices (whether or not user operated) can operate. Further, each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide coverage on one or more carriers, each of which could be frequency division duplex (FDD), defining separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. (In practice, coverage and service provided by an access node respectively on each of multiple such carriers could be considered to define a logically separate access node and may involve use of separate channel cards and the like, but this may also be a matter of terminology.)

Further, each such carrier could be defined within an industry specified frequency band, by its frequency channel(s) being defined within the frequency band. Without limitation, examples of such frequency bands include, without limitation, (i) Band 25, which supports FDD carriers and extends from 1850 MHz to 1915 MHz on the uplink and 1930 MHz to 1995 MHz on downlink, (ii) Band 26, which supports FDD carriers and extends from 814 MHz to 849 MHz on the uplink and 859 MHz to 894 MHz on the downlink, and (iii) Band 41, which supports TDD carriers and extends from 2496 MHz to 2690 MHz.

On the downlink and uplink channels, the air interface on each carrier could be configured in a specific manner to define physical resources for carrying information wirelessly between the access node and UEs.

In a non-limiting example implementation, for instance, the air interface on each carrier could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink of the example air interface could be grouped to define physical resource blocks (PRBs) that could be allocated as needed to carry data between the access node and served UEs.

In addition, certain resource elements on the example air interface could be reserved for special purposes. For instance, on the downlink, certain resource elements could be reserved to carry synchronization signals that indicate the presence of coverage on the carrier, other resource elements could be reserved to carry broadcast messages specifying system information, and still other resource elements could be reserved to carry a reference signal that UEs could measure in order to determine coverage strength.

OVERVIEW

When a UE enters into coverage of an example network, the UE could detect threshold strong coverage of an access node on a particular carrier (e.g., a threshold strong reference signal broadcast by the access node on that carrier) and could then engage in random-access and connection signaling, such as Radio Resource Control (RRC) signaling, to establish an RRC connection or the like through which the access node will then serve the UE on the carrier. Further, if the UE is not already registered for service with the core network, the UE could transmit to the access node an attach request, which the access node could forward to a core-network controller for processing. And the core-network controller and access node could then coordinate setup for the UE of one or more bearers extending between the UE and a core-network gateway that provides transport-network connectivity.

Once the UE is so connected and registered, the access node could then serve the UE in a connected mode on the carrier, managing downlink air-interface communication of packet data to the UE and uplink air-interface communication of packet data from the UE.

For example, with the air interface described above, when packet data for the UE arrives at the core network from a transport network, the data could flow to the UE's serving access node, and the access node could then schedule and provide transmission of that data to the UE on particular downlink PRBs of the carrier. Likewise, when the UE has data to transmit on the transport network, the UE could transmit a scheduling request to the access node, the access node could responsively schedule transmission of that data from the UE on particular uplink PRBs of the carrier, and the UE could accordingly transmit the data to the access node for forwarding through the core network to the transport network.

In some implementations, if an access node supports service on multiple carriers, the access node might also configure carrier-aggregation service for the UE, by adding one or more secondary carriers to the UE's connection with the access node. With carrier aggregation, one of the carriers, typically the one on which the UE initially connected with the access node, is deemed the UE's primary component carrier (PCC) and may be used for key signaling related to the UE's service, whereas each other carrier in the UE's connection is deemed a secondary component carrier (SCC) of the UE's service, functioning mainly to provide the UE with increased aggregate bandwidth and higher associated peak-data rate for instance.

When the industry advances from one generation of wireless technology to the next, or in other scenarios, networks and UEs may also support dual-connectivity service, where a UE is served on co-existing connections according to multiple different RATs.

For instance, a cell site (or a combination of cell sites for that matter) could be equipped with a first access node that provides service according to a first RAT and a second access node that provides service according to a second RAT, and a UE positioned within coverage of the cell site could have a first radio configured to engage in service according to the first RAT and a second radio configured to engage in service according to the second RAT. With this arrangement, the UE may be able to establish a first-RAT connection with the first access node and a second-RAT connection with the second access node, and the access nodes may then concurrently serve the UE over those connections according to their respective RATs.

Such dual-connectivity (or "non-standalone" connectivity) could help facilitate increased peak data-rate of communications, by multiplexing the UE's communications across the multiple RAT connections. Further or alternatively, dual-connectivity may provide other benefits compared with serving a UE on a single connection according to a single RAT (as "standalone" connectivity).

In a representative dual-connectivity implementation, a cell site's first-RAT access node could function as a primary access node and anchor for signaling with the core network and RRC signaling with the UE, and the cell site's second-RAT access node could function as a secondary access node to provide added connectivity and increased aggregate bandwidth for the UE.

When a UE that supports dual-connectivity service enters into coverage of such a cell site, the UE could initially scan for and detect coverage of a primary access node (a first-RAT access node) on a first-RAT carrier and engage in signaling to establish a first-RAT connection between the UE and the primary access node on that carrier as discussed above. Further, the primary access node may also add one or more additional carriers to the UE's first-RAT connection to provide the UE with carrier-aggregation service as noted above.

In addition, perhaps having determined from profile data that the UE is dual-connectivity-capable, the primary access node may then work with the core network, with the secondary access node (second-RAT access node), and with the UE, to establish a second-RAT connection between the UE and the secondary access node on a second-RAT carrier and to configure bearer connectivity for the UE via the secondary access node.

With these first-RAT and second-RAT connections so established for the UE, the primary and secondary access nodes could then serve the UE with packet-data communications on their respective connections with the UE, for instance with a portion of data flowing over the UE's first-RAT connection with the primary access node concurrently with another portion of the data flowing over the UE's second-RAT connection with the secondary access node.

In this dual-connectivity arrangement, the carrier on which the UE is connected with the primary access node (e.g., the sole such carrier or, with carrier-aggregation service, the UE's PCC) could function as an anchor carrier for the UE's dual-connectivity service. As such, for instance, RRC signaling related to the UE's dual-connectivity service could occur on that carrier in particular. Whereas, any other carrier on which the UE is connected with the primary access node, as well as each of one or more carriers on which the UE is concurrently connected with the secondary access node, could function to provide the UE with increased peak data rate and/or other advantages.

In an implementation where an access node operates on multiple carriers and where a UE is connected with the access node on a given one of the carriers (e.g., as the sole carrier in the UE's connection, or as the UE's PCC with carrier aggregation), a situation may arise where it would be useful to transition the UE from being connected with the access node on that carrier to being connected with the access node instead on a different one of the carriers. This transition could be with respect to the carrier as a whole, including both its downlink frequency channel and its uplink frequency channel, or could be with respect to just one of those frequency channels.

By way of example, if and when signal strength and/or signal quality on the carrier on which the UE is connected (the UE's serving carrier) becomes threshold poor, and perhaps further if signal strength and/or signal quality on another carrier (a target carrier) becomes threshold good, then it may be useful to transition the UE from the serving carrier to the target carrier. And as another example, if and when load (e.g., PRB-utilization) on the UE's serving carrier becomes threshold high, and perhaps further if load on a target carrier becomes threshold low, then it may be useful to transition the UE from the serving carrier to the target carrier.

To facilitate these transitions, the UE and/or access node could monitor to determine when one or more predefined thresholds is met. For instance, the UE might monitor to determine when downlink receive signal strength on the UE's serving carrier falls below a predefined threshold level, and perhaps further when downlink receive signal strength on a target carrier rises above a predefined threshold, and to report to the access node accordingly. Further, the access node monitor to determine when uplink receive signal strength from the UE on the UE's serving carrier falls below a predefined threshold. And the access node might monitor to determine when load on the UE's serving carrier rises above a predefined threshold and perhaps further when load on a target carrier falls below a predefined threshold. When one or more such predefined thresholds is met, the access node might then coordinate handover of the UE from one carrier to another.

The present disclosure stems from a realization that it may be useful in some situations to help foster such a transition, particularly to allow the transition to more readily occur.

In particular, it may be useful to help foster such a transition in a situation where the carrier on which the UE is connected with the access node is an anchor carrier for dual-connectivity service of the UE. Causing the carrier transition to more-readily occur in that scenario may help to ensure that the UE maintains good dual-connectivity service, which may be beneficial.

The present disclosure provides for fostering the transition in such a situation by applying one or more adjusted thresholds and/or associated biases for triggering the transition. In particular, when a UE is connected with an access node on a carrier, the access node could determine whether the carrier is an anchor carrier for dual-connectivity service of the UE, e.g., whether the UE is currently served with dual-connectivity service. If not, then the access node may impose use of one or more default thresholds and/or associated biases for triggering the transition of the UE from that carrier to another carrier. Whereas, if so, then the access node may impose use of one or more adjusted thresholds and/or associated biases to help more readily facilitate the transition of the UE from that carrier to the other carrier.

For example, if the access node determines that the carrier on which the UE is connected with the access node is not an anchor carrier for dual-connectivity service of the UE, then, based at least on that determination, the access node may impose use of one or more default thresholds for determining if the signal strength on the UE's serving carrier is threshold low and perhaps if the signal strength on the other carrier is threshold high. But if the access node determines that the carrier on which the UE is connected with the access node is an anchor carrier for dual-connectivity service of the UE, then, based at least on that determination, the access node may impose use of an adjusted level of one or more such thresholds—such as an increased low-threshold for signal strength of the UE's serving carrier and/or decreased high-threshold for signal strength on the other carrier—or one or more analogous bias values for measuring of signal strength.

As to at least signal strength, the access node could apply this process specifically where the transition would be from a relatively high-frequency carrier (e.g., a band-41 carrier) to a relatively low-frequency carrier (e.g., a band-25 carrier), on grounds that transitioning the UE from the high-frequency carrier to the low-frequency carrier could specifically help to improve the UE's anchor-carrier communication, since the low-frequency carrier would have less path loss than the high-frequency carrier.

And as another example, if the access node determines that the carrier on which the UE is connected with the access node is not an anchor carrier for dual-connectivity service of the UE, then, based at least on that determination, the access node may impose use of one or more default thresholds for determining if load on the UE's serving carrier is threshold high and perhaps if load on the other carrier is threshold low. But if the access node determines that the carrier on which the UE is connected with the access node is an anchor carrier for dual-connectivity service of the UE, then, based at least on that determination, the access node may impose use of an adjusted level of one or more such thresholds—such as a decreased high-threshold for load on the UE's serving carrier and/or an increased low-threshold for load on the other carrier—or one or more analogous bias values for measuring load.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of 4G LTE, 5G NR, and 4G-5G dual connectivity, referred to as EUTRA-NR Dual Connectivity (EN-DC). With EN-DC, a 4G access node (4G evolved Node-B (eNB)) functions as the primary access node, and a 5G access node (5G next-generation Node-B (gNB)) functions as the secondary node. Thus, a UE would first establish a standalone-4G connection with a 4G eNB, and the 4G eNB could then coordinate setup of EN-DC service for the UE, including setup for the UE of a secondary 5G connection with the 5G gNB. And the 4G eNB and 5G gNB could then concurrently serve the UE over their respective 4G and 5G connections with the UE.

It should be understood, however, that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways.

As noted above, FIG. 1 is a simplified block diagram of an example wireless communication system in which various disclosed features can be implemented. In particular, the figure depicts a representative arrangement including a cell site 12 having a 4G eNB 14 that provides 4G coverage on at least two example 4G carriers, denoted carriers A and B, and a 5G gNB 16 that provides 5G coverage on an example 5G carrier, denoted carrier C.

Figure 1:
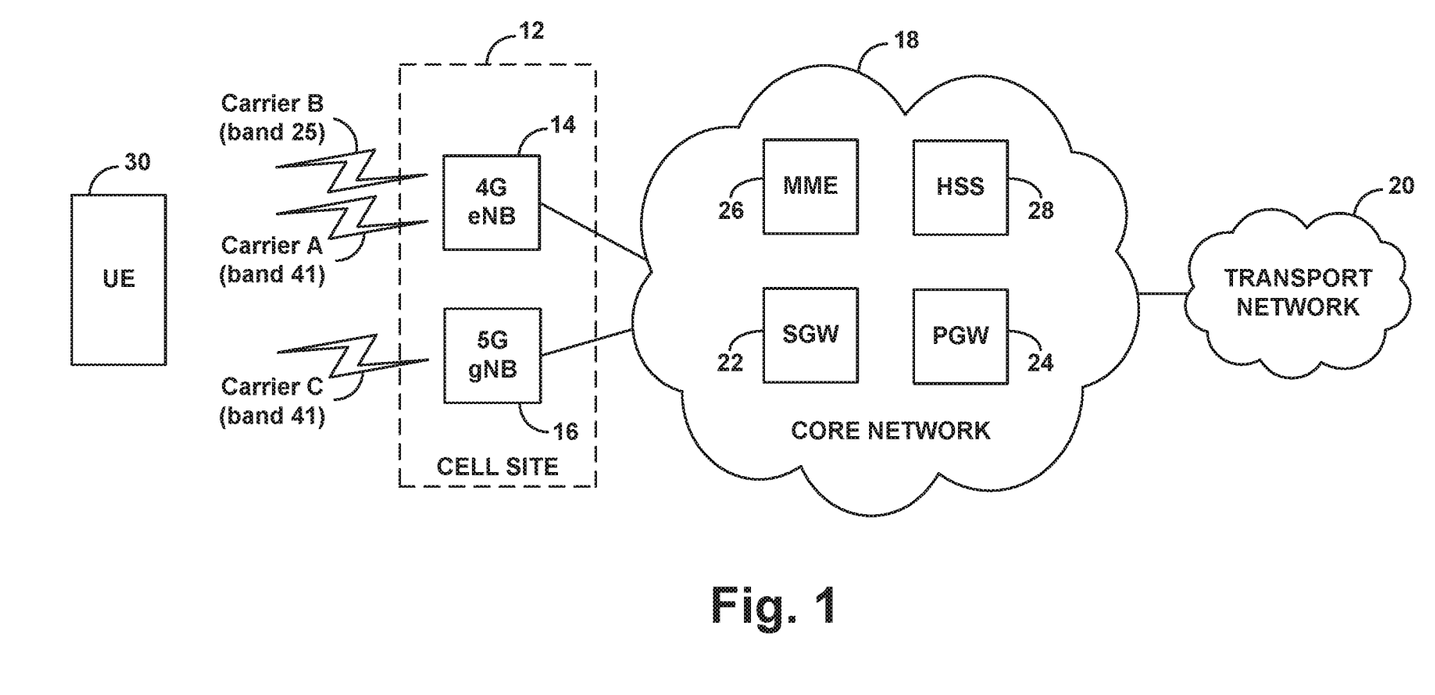
FIG. 1 is a simplified block diagram of an example wireless communication system in which various disclosed features can be implemented.

Each of carriers A, B, and C could be FDD or TDD and could be defined within a particular band such as one of those noted above for instance. For example, as shown, carrier A might be a TDD carrier defined in band 41 (e.g., LTE band B41), carrier B might be an FDD carrier defined in band 25 (e.g., LTE band B25), and carrier C might be a TDD carrier defined in band 41 (e.g., 5G NR band N41). Further, as discussed above, an FDD carrier would have separate downlink and uplink frequency channels each with a respective bandwidth, and a TDD carrier would have a single frequency channel with a particular bandwidth, multiplexed over time between downlink and uplink use.

In an example implementation, the 4G eNB 14 and 5G gNB 16 could be collocated, possibly sharing a common antenna tower or other such equipment, and the coverage provided by the 4G eNB 14 on carriers A and B and by the 5G gNB 16 on carrier C could all be co-directed and at least partially overlapping with each other. Alternatively, other implementations might involve non-collocated access nodes, possibly access nodes at different cell sites that still provide at least partially overlapping coverage.

In addition, each access node could also take various forms. For instance, an access node could be a macro access node of the type that would typically include a tower mounted antenna structure for providing a broad range of coverage. Or an access node could be a small cell access node, femtocell access node, relay access node, or other type of access node that might have a smaller form factor with an antenna structure that provides a narrower range of coverage. Further, access nodes might share an antenna tower and/or other equipment with each other. Other arrangements, including non-collocated access nodes, are possible as well.

The 4G eNB 14 and 5G gNB 16 are each shown coupled with an example core network 18. Core network 18 could be an evolved packet core (EPC) network, a next generation core (NGC) network, or another network including components supporting an applicable radio access technology and providing connectivity with at least one transport network 20, such as the Internet.

In an example implementation as shown, the core network 18 includes a serving gateway (SGW) 22, a packet data network gateway (PGW) 24, a mobility management entity (MME) 26, and a home subscriber server (HSS) 28. Each access node 14, 16 could have an interface with the SGW and an interface with the MME, the MME could have an interface with the SGW and an interface with the HSS, the SGW could have an interface with the PGW, and the PGW could provide connectivity with the transport network.

With this arrangement, the SGW and PGW could cooperatively provide user-plane connectivity between each access node and the transport network, to enable a UE served by an access node to engage in communication on the transport network. Further, the MME could operate as a core-network controller to carry out operations such as coordinating UE attachment and setup of user-plane bearers. And the HSS could store UE profile records, which could specify service-subscription plans, UE configurations, and/ or other such UE capability information, such as whether a UE is EN-DC capable for instance.

As noted above, the air interface between each access node and UEs within its coverage could be structured to define various air-interface resources.

By way of example, in the time domain, the air interface could define a continuum of 10-millisecond (ms) frames, each divided into ten 1-ms subframes, and each subframe could be further divided into a number of timeslots, each additionally divided into symbol time segments. And in the frequency domain, the bandwidth of each carrier on which the access node operates could be divided into subcarriers with specified subcarrier spacing on the order of 15 to 240 kHz. With this example arrangement, the air interface on each carrier would define an array of resource elements each occupying a subcarrier and symbol time segment, and the access node and UEs could communicate with each other through modulation of the subcarriers to carry data in those resource elements. Variations of this arrangement are possible as well.

Further, particular sets of resource elements on the air interface could be grouped together to define the PRBs discussed above. In an example implementation, each PRB could span one timeslot in the time domain and a group of subcarriers in the frequency domain. Depending on the carrier bandwidth, the air interface could thus support a certain number of such PRBs across the bandwidth of the carrier within each timeslot.

In addition, certain resource elements on the downlink and uplink could be reserved for particular control-channel or shared-channel communications.

For instance, on the downlink, certain resource elements per subframe (or per downlink subframe in TDD) could be reserved to define a downlink control region for carrying control signaling such as scheduling directives and acknowledgements from the access node to UEs. And other resource elements per subframe could be reserved to define a shared channel in which PRBs could carry scheduled data communications from the access node to UEs.

Further, in certain subframes, a group of resource elements centered on the center frequency of each carrier could be reserved to carry synchronization signals that UEs could detect as a way to discover coverage of the access node on the carrier and to establish frame timing. And in certain subframes, a group of resource elements also centered on the center frequency of the carrier could be reserved to define a broadcast-channel for carrying system information messages, such as master information block (MIB) and system information block (SIB) messages that UEs could read to obtain operational parameters such as carrier bandwidth (e.g., downlink bandwidth and/or uplink bandwidth) and other information. Further, certain resource elements distributed in a predefined pattern throughout the carrier bandwidth per subframe could be reserved to carry reference signals that UEs could measure as a basis to evaluate coverage strength and quality and to provide channel estimates to facilitate precoding, beamforming, or the like.

On the uplink, on the other hand, certain resource elements per subframe (or per uplink subframe in TDD) could be reserved to define an uplink control region for carrying control signaling such as access requests, channel-quality reports, scheduling requests, and acknowledgements, from UEs to the access node. And other resource elements per subframe could be reserved to define a shared channel in which PRBs could carry scheduled data communications from UEs to the access node. Further, still other resources on the uplink could be reserved for other purposes as well, such as for carrying uplink reference signals or the like.

Note also that the 4G air interface and 4G service provided by the 4G eNB 14 on each 4G carrier A and B could differ from the 5G air interface and 5G service provided by the 5G gNB 16 on the 5G carrier C in various ways now known or later developed. For example, one may provide variable subcarrier spacing, but the other may provide fixed subcarrier spacing. As another example, one may have different symbol time segments than the other. As still another example, one may make use of different MIMO technologies than the other. And as yet another example, with TDD carriers, one may have a flexible TDD configuration and the other may have a fixed TDD configuration. Other examples are possible as well.

FIG. 1 also shows a representative UE 30 within coverage of both the 4G eNB 14 and the 5G gNB 16. UE 30 could be one of possibly many UEs in coverage of the cell site 12 at any given time.

In an example implementation, UE 30 supports 4G service, 5G service, and EN-DC service. For instance, the UE 30 could include a 4G radio and associated RF circuitry for engaging in 4G service over a connection with 4G eNB 14 and a 5G radio and associated RF circuitry for engaging in 5G service over a connection with 5G gNB 16, and the UE 30 could include control logic to enable the UE to engage in EN-DC service, operating concurrently with a 4G connection and a 5G connection.

When UE 30 enters into coverage of the 4G eNB 14, the UE could detect coverage of the 4G eNB on a given one of the 4G carriers A and B, and the UE could determine coverage strength from the 4G eNB on that carrier, such as reference signal receive strength (RSRP) or reference signal receive quality (RSRQ), among other possibilities. If the UE determines that that coverage is sufficiently strong, the UE could then engage in random access signaling and RRC configuration signaling with the 4G eNB as discussed above to connect with the 4G eNB on the carrier, thus putting the UE in an RRC-connected mode on that carrier. Further, the 4G eNB could establish in data storage a context record for the UE and could store in the context record an identification of the UE's established RRC connection and an identification of the 4G carrier on which the UE is connected with the 4G eNB.

In an example implementation, the UE might initially connect with the 4G eNB 14 on the band-41 carrier A. This could be a default mode of operation for the UE. For instance, the UE could be programmed to prefer operation on band 41 over operation on band 25. Therefore, the UE might initially search for 4G coverage on band 41 and may find coverage of the 4G eNB on the band-41 carrier A, and so the UE may initially connect with the 4G eNB on that carrier. Other implementations are of course possible as well.

In addition, once the UE is connected with the 4G eNB, the UE could then transmit to the 4G eNB an attach request if appropriate, which the 4G eNB could forward to the MME for processing as discussed above. And after authenticating the UE, the MME could coordinate setup for the UE of one or more user-plane bearers. For instance, for each such bearer, the MME could engage in signaling with the 4G eNB and the SGW to set up for the UE an S1-U tunnel between the 4G eNB and the SGW, the SGW could responsively engage in signaling with the PGW to set up for the UE an S5 tunnel between the SGW and the PGW, and the 4G eNB could engage in signaling with the UE to set up for the UE a data radio bearer (DRB) between the UE and the eNB. Further, the 4G eNB could coordinate establishment for the UE of a corresponding data radio bearer between the UE and the 4G eNB, and the 4G eNB could record the operational state of the UE in the UE context record.

In relation to this attachment process or at another time, the 4G eNB could also obtain capabilities data regarding the UE and could store the capabilities data in the UE context record for reference while serving the UE. For instance, during the attachment process, the MME could obtain this data from the HSS and could covey the data to the 4G eNB for storage. Alternatively or additionally, the UE could provide the 4G eNB with a capabilities-report that conveys this data to the 4G eNB for storage.

Once the UE is so connected with the 4G eNB on carrier A, the 4G eNB could then provide the UE with data communication service on that carrier as discussed above.

For instance, when data arrives at the 4G eNB for transmission to the UE, the 4G eNB could allocate one or more downlink PRBs in a subframe on the carrier for use to transmit at least a portion of the data, defining a transport block, to the UE. The 4G eNB could then transmit to the UE in the control region of that subframe on the carrier a Downlink Control Information (DCI) message that designates the PRBs, and the 4G eNB could accordingly transmit the transport block to the UE in those designated PRBs on the carrier.

And when the UE has data to transmit to the 4G eNB (e.g., for transmission on the transport network), the UE could transmit to the 4G eNB on the carrier a scheduling request that carries with it a buffer status report (BSR) indicating how much data the UE has buffered for transmission. And in response, the 4G eNB could allocate one or more uplink PRBs in an upcoming subframe on the carrier for carrying a transport block of that data from the UE and could transmit to the UE on the carrier a DCI message that designates those upcoming PRBs. The UE could then accordingly transmit the transport block to the 4G eNB in the designated PRBs.

Note also that the 4G eNB may serve multiple UEs at once on each carrier on which the 4G eNB provides service. To facilitate this, the 4G eNB could apply a scheduling algorithm in an effort to fairly allocate the PRBs of each such carrier for use by the various served UEs, taking into account a variety of factors such as UE subscription-service level, type of service, and the like. Thus, when UE 30 is connected with and served by the 4G eNB on carrier A, the 4G eNB may be serving one or more other UEs at the same time on that carrier.

Further, in response to one or more trigger conditions, such as a desire to provide the UE with higher peak data rate of communications, and given the UE's support for EN-DC service, the 4G eNB could also work to coordinate setup for the UE of EN-DC service.

The process of coordinating setup of EN-DC service for the UE could take various forms. For example, the process could involve signaling over an inter-access-node interface (e.g., an X2 interface) with the 5G eNB 16, and signaling with the UE to coordinate setup of a 5G connection between the UE and the 5G eNB on carrier C. Further, for each of one or more user-plane bearers established for the UE, the process could involve working with the 5G gNB and perhaps with the MME, to coordinate setup for the UE of a split bearer so that a portion of the UE's user-plane communications could be served by the 4G eNB and another portion of the UE's user-plane communications could be served by the 5G gNB. This split bearer could be configured in various ways, such as (i) at the SGW, with one leg extending between the SGW and the 4G eNB and another leg extending between the SGW and the 5G gNB, (ii) at the 4G eNB, with the UE's 5G communications passing over an interface between the 4G and 5G access nodes, or (iii) at the 5G gNB, with the UE's 4G communications passing over an interface between the 4G and 5G access nodes.

Once EN-DC service is set up for the UE, the 4G and 5G access nodes could then both serve the UE concurrently with packet-data communications. For instance, in the manner discussed above, each access node could schedule and provide downlink data communication to the UE over its respective connection with the UE, and each access node could schedule and receive uplink communication from the UE over its respective connection with the UE. Alternatively, the UE's 4G and 5G connections might both support downlink scheduled communications to the UE but just one of those connections (perhaps just the 5G connection, or just the 4G connection) might support uplink scheduled communications from the UE. Regardless, in example EN-DC service, the UE would be concurrently connected with and served by the 4G eNB and the 5G gNB.

When the UE is connected with and served by the 4G eNB on a given carrier (e.g., the sole such carrier or, with carrier-aggregation service, the UE's PCC), with or without EN-DC service being configured for the UE, at issue as noted above may whether and when the 4G eNB should hand over or otherwise transition the UE from being connected with the 4G eNB on that carrier to being connected with the 4G eNB instead on another carrier. For example, when the UE is connected with the 4G eNB on carrier A, at issue may be whether and when the 4G eNB should transition the UE from being connected with the 4G eNB on carrier A to being connected with the 4G eNB instead on carrier B.

In line with the discussion above, the 4G eNB and/or UE could monitor to determine when one or more predefined thresholds is met, as a basis to trigger this carrier transition.

Further, as noted above, the present disclosure provides for dynamically setting of adjusting one or more such thresholds or associated measurement biases, based on whether the carrier on which the UE is connected with the 4G eNB is an anchor carrier for EN-DC service of the UE—e.g., whether the UE currently has EN-DC service configured and is thus served with EN-DC service. For instance, an example threshold could have default value that the 4G eNB and/or UE would normally apply as a basis to trigger the carrier transition, but the 4G eNB and/or UE could dynamically adjust that threshold to help foster the carrier transition when the carrier is an anchor carrier for EN-DC service of the UE.

In one example implementation, as noted above, at issue could be signal strength. Here, for instance, thresholds that could be applied as a basis to trigger the carrier transition could include (i) a low-threshold for downlink signal strength on the UE's serving carrier, for determining when downlink receive signal strength from the 4G eNB as measured by the UE on the UE's serving carrier is threshold low, (ii) a low-threshold for uplink signal strength on the UE's serving carrier, for determining when uplink receive signal strength from the UE as measured by the 4G eNB on the UE's serving carrier is threshold low, and (iii) a high-threshold for downlink signal strength on the target carrier, for determining when downlink receive signal strength from the 4G eNB as measured by the UE on the target carrier is threshold high. Representative metrics for these or other thresholds could be RSRP, RSRQ, signal-to-interference-plus-noise ratio (SINR), and/or receive signal strength indicator (RSSI), among others.

As to downlink signal strength, the 4G eNB could broadcast or transmit to the UE one or more measurement objects that each cause the UE to measure downlink signal strength and to transmit to the 4G eNB a measurement report when a specified measurement event occurs. Each such measurement object could specify a carrier or carriers for the UE to monitor and, for each such carrier, a respective threshold for downlink signal strength.

For instance, (i) an "A2" measurement object could specify a low-threshold for downlink signal strength on the UE's serving carrier, (ii) an "A4" measurement object, which the 4G eNB might provide in response to the UE reporting occurrence of the A2 measurement event, could specify a high-threshold for downlink signal strength on the target carrier, and (iii) an "A5" measurement object, which the 4G eNB might similarly provide in response to the UE reporting occurrence of the A2 measurement event, could specify both a low-thresholds for downlink signal strength on the UE's serving carrier and a high-thresholds for downlink signal strength on the target carrier.

In response to receipt of such a measurement object, the UE could thus monitor downlink signal strength as indicated and, upon occurrence of the indicated measurement event, could transmit to the 4G eNB a measurement report indicating the occurrence of the measurement event.

Further, as to uplink signals strength, the 4G eNB itself might determine when uplink signal strength from the UE on the UE's serving carrier falls below a defined low-threshold level.

When the 4G eNB thereby detects a handover condition, such as threshold low downlink and/or uplink signal strength on the UE's serving carrier A and threshold high downlink signal strength on the target carrier B for instance, the 4G eNB could responsively orchestrate a handover or other transition of the UE from being connected with the 4G eNB on carrier A to being connected with the 4G eNB instead on carrier B. For instance, the 4G eNB could transmit to the UE an RRC message that directs and causes the UE to operate on carrier B rather than carrier A, and the 4G eNB could update the UE's context record accordingly. The 4G eNB could then proceed to serve the UE on the carrier B.

In an example implementation, when the carrier on which the UE is connected with the 4G eNB is not an anchor carrier for EN-DC service of the UE, the 4G eNB could specify or apply default values for these thresholds. For instance, in that case, the 4G eNB could set each low-threshold to a value on the order of −105 decibel-milliwatts (dBm), and the 4G eNB might set the high-threshold to a value on the order of −95 dBm.

However, when the carrier on which the UE is connected with the 4G eNB is an anchor carrier for EN-DC service of the UE, the 4G eNB could dynamically set or adjust each of one or more such measurement thresholds to make it easier for the carrier transition to occur. For instance, in that case, the 4G eNB could increase each low-threshold (e.g., by a few dBm or some other designated delta) so that the downlink receive signal strength and/or uplink receive signal strength on the UE's serving carrier could be deemed threshold low at a level higher than the default threshold. And/or, the 4G eNB could decrease each high-threshold (e.g., by a few dBm or some other designated delta) so that the UE's downlink receive signal strength on the target carrier could be deemed threshold high at a level lower than the default threshold.

In practice, the act of dynamically setting or adjusting one or more such signal-strength threshold values could also be accomplished by dynamically setting or adjusting one or more measurement bias values. For instance, (i) for an increased low-threshold for downlink signal strength, the 4G eNB could direct the UE to decrease the UE's measurement of downlink signal strength by an associated bias value, (ii) for an increased low-threshold for uplink signal strength, the 4G eNB could itself decrease its measured uplink signal strength by an associated bias value, and (iii) for a decreased high-threshold for downlink signal strength, the 4G eNB could direct the UE to increase the UE's measurement of uplink signal strength by an associated bias value.

As further noted above, helping to foster the UE's carrier transition could be especially useful for an EN-DC-connected UE if the UE's serving carrier is relatively high frequency and the target carrier would be relatively low frequency. For instance, this could be the case in the arrangement of FIG. 1, where the UE's serving carrier A is a band-41 carrier and the target carrier B is a band-25 carrier. In that case, as the UE approaches the edge of coverage of the band-41 carrier A, it would be especially useful to foster transition of the UE to the lower-path-loss band-25 carrier B, in order to help maintain good anchor carrier coverage for the UE's EN-DC service.

Accordingly, an additional basis that the 4G eNB could consider for adjusting one or more signal strength thresholds for triggering the UE's carrier transition could be that the target carrier is lower in frequency than the UE's serving carrier (e.g., that the target carrier is in a band lower in frequency than the serving carrier's band). Thus, in an example implementation, the 4G eNB could make a determination that both (i) carrier A on which the UE is connected with the 4G eNB is an anchor carrier for EN-DC service of the UE and (ii) candidate target carrier B is lower in frequency than carrier A. And in response to that determination, the 4G eNB could then impose use of one or more adjusted thresholds to help foster the carrier transition as noted above.

In addition or alternatively, as noted above, at issue could be carrier load. Here, for instance, thresholds that could be applied as a basis to trigger the UE's carrier transition could include (i) a high-threshold for load on the UE's serving carrier and (ii) a low-threshold for load on the target carrier. Representative load metrics could be percentage PRB utilization, number of connected UEs, and/or control channel occupancy, among others.

The 4G eNB could track one or more such load metrics on a per carrier basis. And the 4G eNB could determine when a load-based trigger exists for the carrier transition. For instance, the 4G eNB could determine when load on the UE's serving carrier is at least a high as a defined high-threshold level and perhaps further when load on a target carrier is at least as low as a defined low-threshold level. And in response, the 4G eNB could orchestrate handover or other transition of the UE from being connected with the 4G eNB on the serving carrier to being connected with the 4G eNB instead on the target carrier, as discussed above.

As with signal strength, the 4G eNB could dynamically vary one or more such load-based thresholds based on whether the carrier on which the UE is connected with the 4G eNB is an anchor carrier for EN-DC service of the UE—e.g., if the EN-DC service is currently configured for the UE. For instance, if and when the carrier on which the UE is connected with the 4G eNB is not an anchor carrier for the UE, the 4G eNB could apply a default value for each of one or more such load thresholds. Whereas, if and when the carrier on which the UE is connected with the 4G eNB is an anchor carrier for EN-DC service of the UE, the 4G eNB could dynamically set or adjust each of one or more such load thresholds to make it easier for the carrier transition to occur. For instance, in that case, the 4G eNB could decrease (e.g., by a defined delta) the high-threshold for load on the UE's serving carrier and/or the 4G eNB could increase (e.g., by a defined delta) the low-threshold for load on the target carrier.

Figure 2:
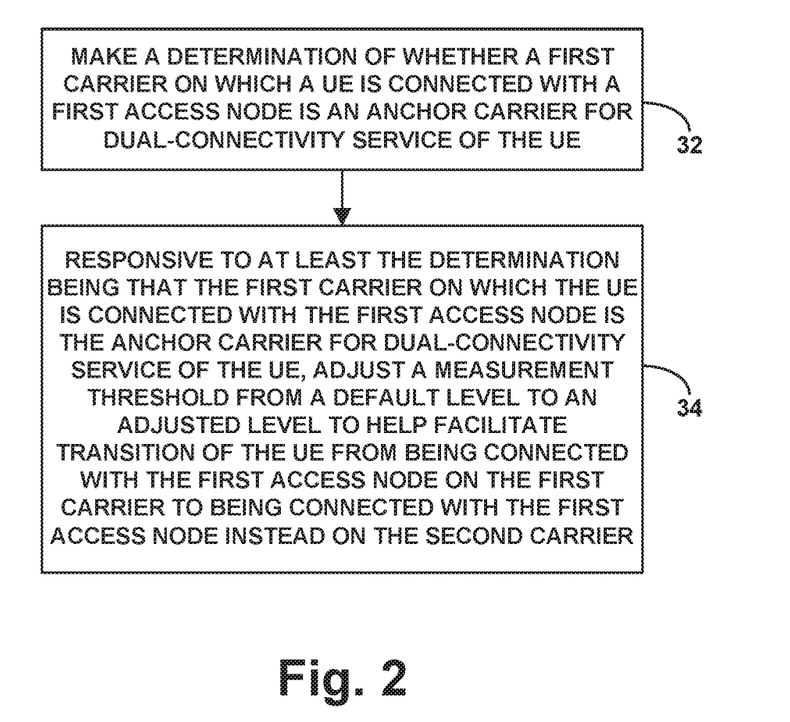
FIG. 2 is a flow chart depicting an example method in accordance with the present disclosure.

FIG. 2 is a flow chart depicting a method that could be carried out in accordance with the present disclosure, to control a measurement threshold used for triggering transition of a UE from being connected with a first access node on a first carrier (e.g., as the sole such carrier or, with carrier aggregation, as the UE's PCC) to being connected with the first access node instead on a second carrier. This method could be carried out by or on behalf of the first access node, among other possibilities. Further, as noted above, the carrier transition at issue could be a full carrier transition or a transition of just the UE's uplink channel or just the UE's downlink channel.

As shown in FIG. 2, at block 32, the method includes making a determination of whether the first carrier on which the UE is connected with the first access node is an anchor carrier for dual-connectivity service of the UE. And at block 34, the method includes, responsive to at least the determination being that the first carrier on which the UE is connected with the first access node is the anchor carrier for dual-connectivity service of the UE, adjusting the measurement threshold from a default level to an adjusted level to help facilitate transition of the UE from being connected with the first access node on the first carrier to being connected with the first access node instead on the second carrier.

In line with the discussion above, the measurement threshold at issue in this method could be a signal-strength threshold, in which case the adjusting could be additionally responsive a determination that the second carrier is lower in frequency than the first carrier. Further, as to a signal-strength threshold, the measurement threshold could be (i) a low-threshold for downlink signal strength from the access node on the first carrier, in which case, the adjusted level could be higher than the default level, (ii) a low-threshold for uplink signal strength from the UE on the first carrier, in which case the adjusted level could be higher than the default level, or (iii) a high-threshold for signal strength from the access node on the second carrier, in which case the adjusted level could be lower than the default level, among other possibilities.

Further or alternatively, as discussed above, the measurement threshold could be a load threshold. For instance, the measurement threshold could be (i) a high-threshold for load on the first carrier, in which case the adjusted level could be higher than the default level, or (ii) a low-threshold for load on the second carrier, in which case the adjusted level could be lower than the default level.

As further discussed above, the act of making the determination of whether the first carrier is an anchor carrier for dual-connectivity service of the UE could involve determining whether dual-connectivity service is currently configured for the UE. Thus, the determination could be that the first carrier is the anchor carrier if dual-connectivity service is currently configured for the UE, and the determination could instead be that the first carrier is not the anchor carrier if dual-connectivity service is not currently configured for the UE.

Further, as discussed above, the act of adjusting the measurement threshold could apply changing the measurement threshold itself and/or imposing application of a measurement bias to achieve the same goal.

In addition, as discussed above, the first access node could be configured to provide service in accordance with a first RAT, and the dual-connectivity service could involve the UE being served by the first access node in accordance with the first RAT concurrently with the UE being served by a second access node in accordance with a second RAT. For instance, as noted above, the first RAT could be 4G LTE, the second RAT could be 5G NR, and the dual-connectivity service could be EN-DC service.

Figure 3:
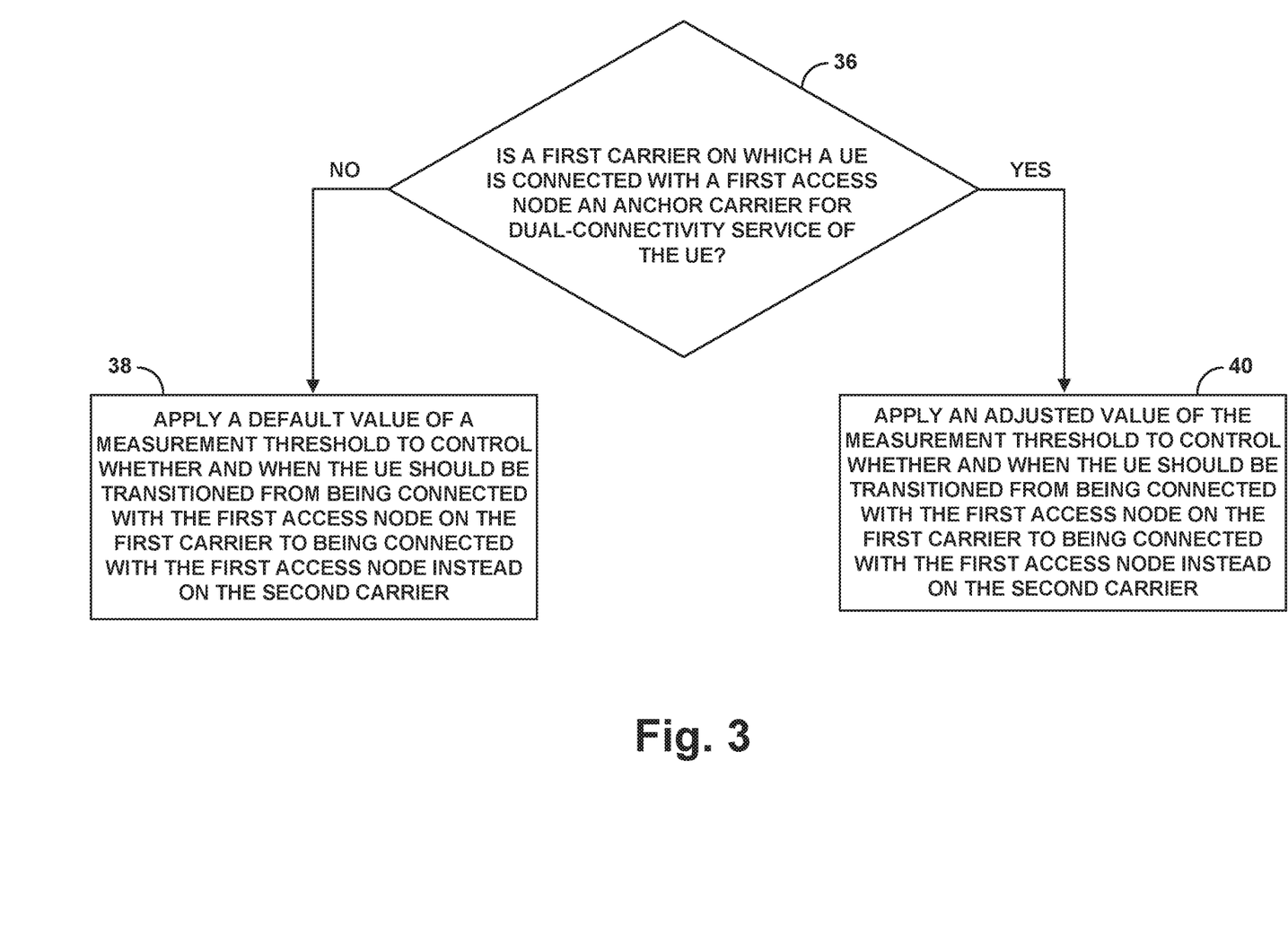
FIG. 3 is another flow chart depicting an example method in accordance with the present disclosure.

FIG. 3 is next a flow chart depicting a method that could be carried out in accordance with the present disclosure to help control transition of a UE from being connected with a first access node on a first carrier to being connected with the first access node instead on a second carrier.

As shown in FIG. 3, at block 36, the method includes making a determination of whether the first carrier on which the UE is connected with the first access node is an anchor carrier for dual-connectivity service of the UE. Further, at block 38, the method includes, if the determination is that first carrier on which the UE is connected with the first access node is not the anchor carrier for dual-connectivity service of the UE, then, based at least on the determination, applying a default value of a measurement threshold to control whether and when the UE should be transitioned from being connected with the first access node on the first carrier to being connected with the first access node instead on the second carrier. And at block 40, the method includes, if the determination is that first carrier on which the UE is connected with the first access node is the anchor carrier for dual-connectivity service of the UE, then, based at least on the determination, applying an adjusted value of the measurement threshold to control whether and when the UE should be transitioned from being connected with the first access node on the first carrier to being connected with the first access node instead on the second carrier.

In practice, for instance, the first access node could apply (by itself or by directing the UE) default value for the measurement threshold when the UE is not dual-connected. And once the UE becomes dual-connected, the first access node could then apply the adjusted value for the measurement threshold.

Various features described above can be applied in this context as well, and vice versa. For instance, the measurement threshold could be a signal-strength threshold or a load threshold, among other possibilities. And in either case, application of the adjusted value of the measurement threshold could be additionally based on determining that the second carrier is lower in frequency than the first carrier. Further, the transition of the UE from being connected with the first access node on the first carrier to being connected with the first access node instead on the second carrier could be as to the carrier as a whole or as to just an uplink channel or just a downlink channel.

Figure 4:
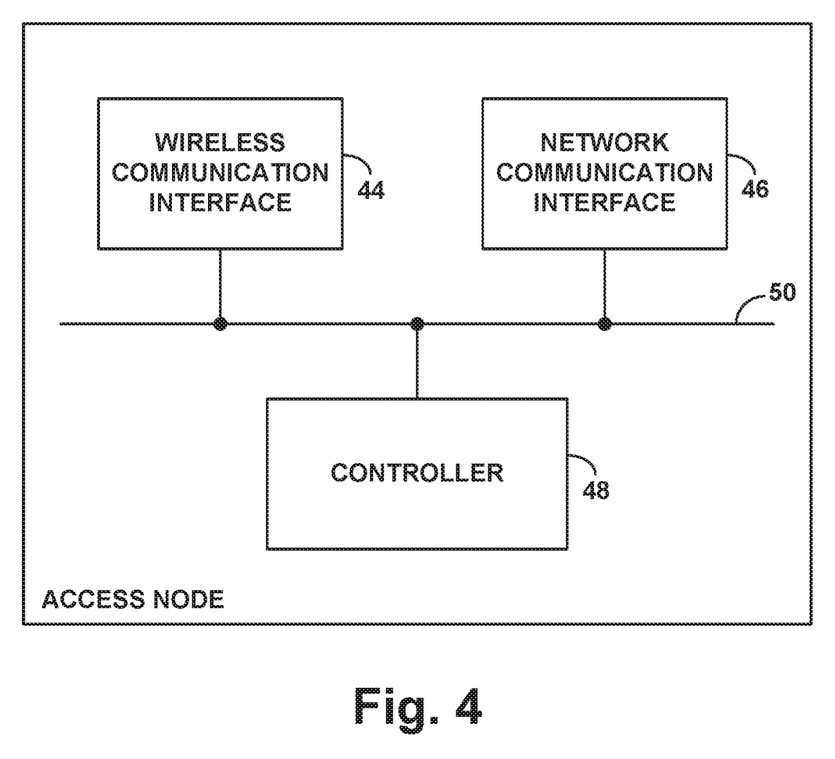
FIG. 4 is a simplified block diagram of an example access node operable in accordance with the present disclosure.

Finally, FIG. 4 is a simplified block diagram of an example first access node that could be configured in accordance with the present disclosure to control a measurement threshold used for triggering transition of a UE from being connected with the first access node on a first carrier to being connected with the first access node instead on a second carrier.

As shown, the example first access node includes a wireless communication interface 44, a network communication interface 46, and a controller 48, all of which could be integrated together and/or communicatively linked together by a system bus, network, or other connection mechanism 50.

In this example arrangement, the wireless communication interface 44 (which might comprise multiple separate wireless communication interfaces or an integrated interface) could be configured to provide cellular coverage and service on both the first carrier and the second carrier. As such, the wireless communication interface 44 could comprise an antenna structure, which could be tower mounted or could take other forms, and associated components such as a power amplifier and a wireless transceiver, to facilitate operation as described above. Further, network communication interface 46 could comprise a wired or wireless interface, such as an Ethernet network communication interface, configured to support communication with other entities, such as entities core network 20.

Controller 48 could then comprise control logic to cause the first access node to carry out particular operations including those discussed above. As such, the controller 48 could take various forms, including but not limited to a processing unit including one or more processors (e.g., general purpose microprocessors and/or dedicated processing units) and non-transitory data storage (e.g., one or more volatile and/or non-volatile storage components, such as magnetic, optical, or flash storage) holding, storing, encoded with, or otherwise embodying or having program instructions executable by the processing unit to cause the first access node to carry out various operations described herein. It should also be understood that the present disclosure contemplates a non-transitory computer readable medium holding, storing, encoded with, or otherwise embodying or having program instructions executable to carry out such operations as well.

Various features described above can be applied in this context as well, and vice versa.

Exemplary embodiments have been described above. Those skilled in the art will understand, however, that changes and modifications may be made to these embodiments without departing from the true scope and spirit of the invention.

I claim:

1. A method for controlling a measurement threshold used for triggering transition of a user equipment device (UE) from being connected with a first access node on a first carrier to being connected with the first access node instead on a second carrier, the method comprising:

making a determination of whether the first carrier on which the UE is connected with the first access node is an anchor carrier for dual-connectivity service of the UE; and responsive to at least the determination being that the first carrier on which the UE is connected with the first access node is the anchor carrier for dual-connectivity service of the UE, adjusting the measurement threshold from a default level to an adjusted level to help facilitate transition of the UE from being connected with the first access node on the first carrier to being connected with the first access node instead on the second carrier.

2. The method of claim 1, wherein the method is carried out by the first access node.

3. The method of claim 1, wherein the measurement threshold is a signal-strength threshold, and wherein the adjusting is additionally responsive a determination that the second carrier is lower in frequency than the first carrier.

4. The method of claim 1, wherein the measurement threshold is a low-threshold for downlink signal strength from the access node on the first carrier, and wherein the adjusted level is higher than the default level.

5. The method of claim 1, wherein the measurement threshold is a low-threshold for uplink signal strength from the UE on the first carrier, and wherein the adjusted level is higher than the default level.

6. The method of claim 1, wherein the measurement threshold is a high-threshold for signal strength from the access node on the second carrier, and wherein the adjusted level is lower than the default level.

7. The method of claim 1, wherein the measurement threshold is a high-threshold for load on the first carrier, and wherein the adjusted level is higher than the default level.

8. The method of claim 1, wherein the measurement threshold is a low-threshold for load on the second carrier, and wherein the adjusted level is lower than the default level.

9. The method of claim 1, wherein making the determination of whether the first carrier is an anchor carrier for dual-connectivity service of the UE comprises determining whether dual-connectivity service is currently configured for the UE, wherein the determination is that the first carrier is the anchor carrier if dual-connectivity service is currently configured for the UE and wherein the determination is that the first carrier is not the anchor carrier if dual-connectivity service is not currently configured for the UE.

10. The method of claim 1, wherein the first access node provides service in accordance with a first radio access technology (RAT), and wherein the dual-connectivity service comprises the UE being served by the first access node in accordance with the first RAT concurrently with the UE being served by a second access node in accordance with a second RAT.

11. The method of claim 10, wherein the first RAT is 4G LTE, the second RAT is 5G NR, and the dual-connectivity service is EUTRA-NR Dual Connectivity (EN-DC) service.

12. The method of claim 1, wherein the first carrier is a primary component carrier of carrier aggregation service of the UE.

13. The method of claim 1, wherein the transition of the UE from being connected with the first access node on the first carrier to being connected with the first access node instead on the second carrier is as to just an uplink channel or just a downlink channel.

14. A method to control transition of a user equipment device (UE) from being connected with a first access node on a first carrier to being connected with the first access node instead on a second carrier, the method comprising:

making a determination of whether the first carrier on which the UE is connected with the first access node is an anchor carrier for dual-connectivity service of the UE;

if the determination is that first carrier on which the UE is connected with the first access node is not the anchor carrier for dual-connectivity service of the UE, then, based at least on the determination, applying a default value of a measurement threshold to control whether and when the UE should be transitioned from being connected with the first access node on the first carrier to being connected with the first access node instead on the second carrier; and if the determination is that first carrier on which the UE is connected with the first access node is the anchor carrier for dual-connectivity service of the UE, then, based at least on the determination, applying an adjusted value of the measurement threshold to control whether and when the UE should be transitioned from being connected with the first access node on the first carrier to being connected with the first access node instead on the second carrier.

15. The method of claim 14, wherein the measurement threshold is a signal-strength threshold.

16. The method of claim 14, and wherein applying the adjusted value of the measurement threshold is additionally based on determining that the second carrier is lower in frequency than the first carrier.

17. The method of claim 14, wherein the measurement threshold is a load threshold.

18. The method of claim 14, wherein the transition of the UE from being connected with the first access node on the first carrier to being connected with the first access node instead on the second carrier is as to just an uplink channel or just a downlink channel.

19. A first access node configured to control a measurement threshold used for triggering transition of a user equipment device (UE) from being connected with the first access node on a first carrier to being connected with the first access node instead on a second carrier, the first access node comprising:

a wireless communication interface through which the first access node is configured to provide the service on the first carrier and on the second carrier;

a network communication interface though which the first access node is configured to communicate on a core network; and a controller for controlling the measurement threshold by carrying out operations including:

making a determination of whether the first carrier on which the UE is connected with the first access node is an anchor carrier for dual-connectivity service of the UE, and responsive to at least the determination being that the first carrier on which the UE is connected with the first access node is the anchor carrier for dual-connectivity service of the UE, adjusting the measurement threshold from a default level to an adjusted level to help facilitate transition of the UE from being connected with the first access node on the first carrier to being connected with the first access node instead on the second carrier.

20. The first access node of claim 19, wherein the controller comprises a processing unit, non-transitory data storage, and program instructions stored in the non-transitory data storage and executable by the processing unit to carry out the operations.

* * * * *